United States Patent
Eleftheriou et al.

(10) Patent No.: US 8,484,251 B2
(45) Date of Patent: *Jul. 9, 2013

(54) MULTI-DIMENSIONAL TRANSFORM FOR DISTRIBUTED MEMORY NETWORK

(75) Inventors: Maria Eleftheriou, Mt. Kisco, NY (US); Blake G. Fitch, White Plains, NY (US); Robert S. Germain, Larchmont, NY (US); Aleksandr Rayshubskiy, Pleasantville, NY (US); Thomas James Christopher Ward, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 99 days.

This patent is subject to a terminal disclaimer.

(21) Appl. No.: 12/819,511

(22) Filed: Jun. 21, 2010

(65) Prior Publication Data

US 2010/0257209 A1   Oct. 7, 2010

Related U.S. Application Data

(63) Continuation of application No. 10/887,026, filed on Jul. 8, 2004, now Pat. No. 7,788,310.

(51) Int. Cl.
*G06F 7/00* (2006.01)
*G06F 17/30* (2006.01)

(52) U.S. Cl.
USPC .......................................................... 707/801

(58) Field of Classification Search
USPC .................................................. 707/801, 722
See application file for complete search history.

(56) References Cited

U.S. PATENT DOCUMENTS

| | | | | |
|---|---|---|---|---|
| 5,126,962 A | * | 6/1992 | Chiang | 708/401 |
| 5,548,761 A | * | 8/1996 | Balasundaram et al. | 717/159 |
| 5,751,616 A | * | 5/1998 | Hegland et al. | 708/401 |
| 6,950,843 B2 | * | 9/2005 | Nakanishi | 708/401 |

* cited by examiner

*Primary Examiner* — Robert Beausoliel, Jr.
(74) *Attorney, Agent, or Firm* — Michael J. Buchenhorner; Vazken Alexanian (57) ABSTRACT

A computer readable storage medium for performing a transform of a multidimensional matrix in a distributed memory network by: storing a multidimensional matrix of side N in a distributed memory network with a plurality of nodes and distributing work associated with a calculation of a transform of the matrix among $N^2$ of the plurality of nodes. The medium further receives results of the calculation of the transform of the matrix by the nodes.

20 Claims, 8 Drawing Sheets

MULTI-DIMENSIONAL TRANSFORM FOR DISTRIBUTED MEMORY NETWORK

CROSS-REFERENCE TO RELATED APPLICATIONS

This application is a continuation of, and claims priority from, commonly-owned, co-pending U.S. patent application Ser. No. 10/887,026, filed on Jul. 8, 2004, which is incorporated by reference herein.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of numerical algorithms and more particularly relates to the field of computing numerical algorithms in a distributed computing environment.

BACKGROUND OF THE INVENTION

Three-dimensional Fast Fourier Transforms (FFTs) are critical to a number of numerical algorithms, in particular for the group of methods that are used in N-body simulations of systems with electrostatic forces, termed "Particle-Mesh" or "Particle-Particle-Particle-Mesh". As multidimensional FFTs are computationally intensive problems, they are often calculated on large, massively parallel networks, such as in a distributed computing environment. The implementation of a FFT on a network having a distributed memory, however, raises certain problems. A distributed computing network requires communication of instructions and data between nodes, which is computationally costly and time-consuming. Also, a network having a distributed memory requires management of memory access across the distributed memory. Further, the computation of a FFT on a network having a distributed memory requires appropriate distribution of the work associated with calculating the FFT among the multiple nodes comprising the network.

One approach to this problem is the "slab" decomposition which allows scaling (or distribution of work) among N nodes for a three dimensional N.times.N.times.N matrix of input data. This approach, however, does not allow for further, more extensive scaling among additional nodes. Therefore, a need exists to overcome the problems with the prior art as discussed above, and particularly for a way to make the computation of a FFT on a distributed memory network more efficient.

SUMMARY OF THE INVENTION

Briefly, according to an embodiment of the present invention, a method for performing a transpose of a multidimensional matrix in a distributed memory network is disclosed. The method includes storing a multidimensional matrix of side N in a distributed memory network comprising a plurality of nodes and distributing work associated with a calculation of a transpose of the matrix among N2 of the plurality of nodes. The method further includes receiving results of the calculation of the transpose of the matrix by the nodes.

Also disclosed is an information processing system for performing a transpose of a multidimensional matrix in a distributed memory network. The information processing system includes a processor configured for storing a multidimensional matrix of side N in a distributed memory network comprising a plurality of nodes. The information processing system further includes a transmitter for distributing work associated with a calculation of a transpose of the matrix among N.sup.2 of the plurality of nodes. The information processing system further includes a receiver for receiving results of the calculation of the transpose of the matrix by the nodes.

In another embodiment of the present invention, the information processing system includes a plurality of nodes including distributed memory for storing a multidimensional matrix of side N and a control node configured for distributing to N.sup.2 of the plurality of nodes work associated with a calculation of a transpose of the matrix. The information processing system further includes a communications network for relaying results of the calculation of the transpose of the matrix by the nodes.

The method can also be implemented as machine executable instructions executed by a programmable information processing system or as hard coded logic in a specialized computing apparatus such as an application-specific integrated circuit (ASIC). Thus, also disclosed is a computer readable medium including computer instructions for storing a multidimensional matrix of side N in a distributed memory network comprising a plurality of nodes. The computer readable medium further includes instructions for distributing work associated with a calculation of a transpose of the matrix among N.sup.2 of the plurality of nodes. The computer readable medium further includes instructions for receiving results of the calculation of the transpose of the matrix by the nodes.

The foregoing and other features and advantages of the present invention will be apparent from the following more particular description of the preferred embodiments of the invention, as illustrated in the accompanying drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Figure 7:
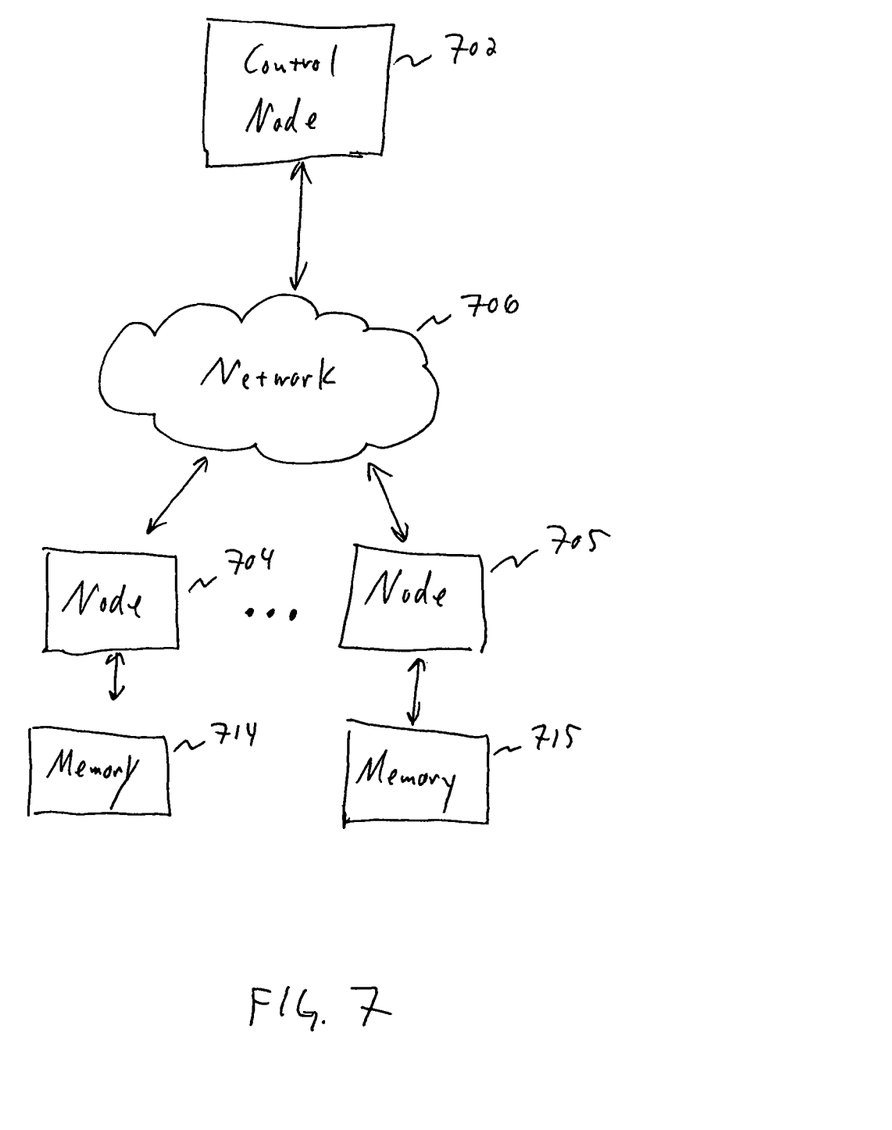
FIG. 7 is a high level block diagram showing the network architecture of a distributed network for implementing one embodiment of the present invention.

FIG. 7 is a high level block diagram showing the network architecture of a distributed network for implementing one embodiment of the present invention. FIG. 7 shows a control node 702 and other, worker, nodes 704 through 705 connected to a network 706. It should be noted that although FIG. 7 shows only nodes 704 and 705, the system architecture of the present invention allows for any number of nodes connected to the network 706. The control node 702, which is described in greater detail below, exhibits control over the nodes 704 through 705 by distributing work associated with computations and other tasks. This process is described in greater detail with reference to FIG. 2 below. Briefly, the control node 702 assigns data points to the nodes 704 through 705 for calculation of a transpose numerical algorithm and in response the control node 702 receives the results of the calculation from the nodes 704 through 705. Note that the control node 702 is depicted as a single, standalone, node or computer but can exist in a distributed fashion, operating in a distributed computing paradigm.

FIG. 7 further shows memory 714 connected to node 704 and memory 715 connected to node 715. Note that the network of FIG. 7 is a distributed memory network wherein there is no direct memory access between nodes. In this paradigm, information stored in distributed memory, such as memory 714 and memory 715, must be exchanged via the use of messages or other information exchange processes in order to be available to other nodes.

In an embodiment of the present invention, the computer systems of the control node 702 and the nodes 704 through 705 are one or more Personal Computers (PCs) (e.g., IBM or compatible PC workstations running the Microsoft Windows operating system, Macintosh computers running the Mac OS operating system, LINUX work stations, or equivalent), Personal Digital Assistants (PDAs), hand held computers, palm top computers, smart phones, game consoles or any other information processing devices. In another embodiment, the computer systems of the control node 702 and the nodes 704 through 705 are a server system (e.g., SUN Ultra workstations running the SunOS operating system, UNIX Work stations or IBM RS/6000 workstations and servers running the AIX operating system). The computer systems of the control node 702 and the nodes 704 through 705 are described in greater detail below with reference to FIG. 8.

In an embodiment of the present invention, the network 706 is a circuit switched network, such as the Public Service Telephone Network (PSTN). In another embodiment, the network 706 is a packet switched network. The packet switched network is a wide area network (WAN), such as the global Internet, a private WAN, a telecommunications network or any combination of the above-mentioned networks. In yet another embodiment, the network 706 is a wired network, a wireless network, a broadcast network or a point-to-point network.

Figure 2:
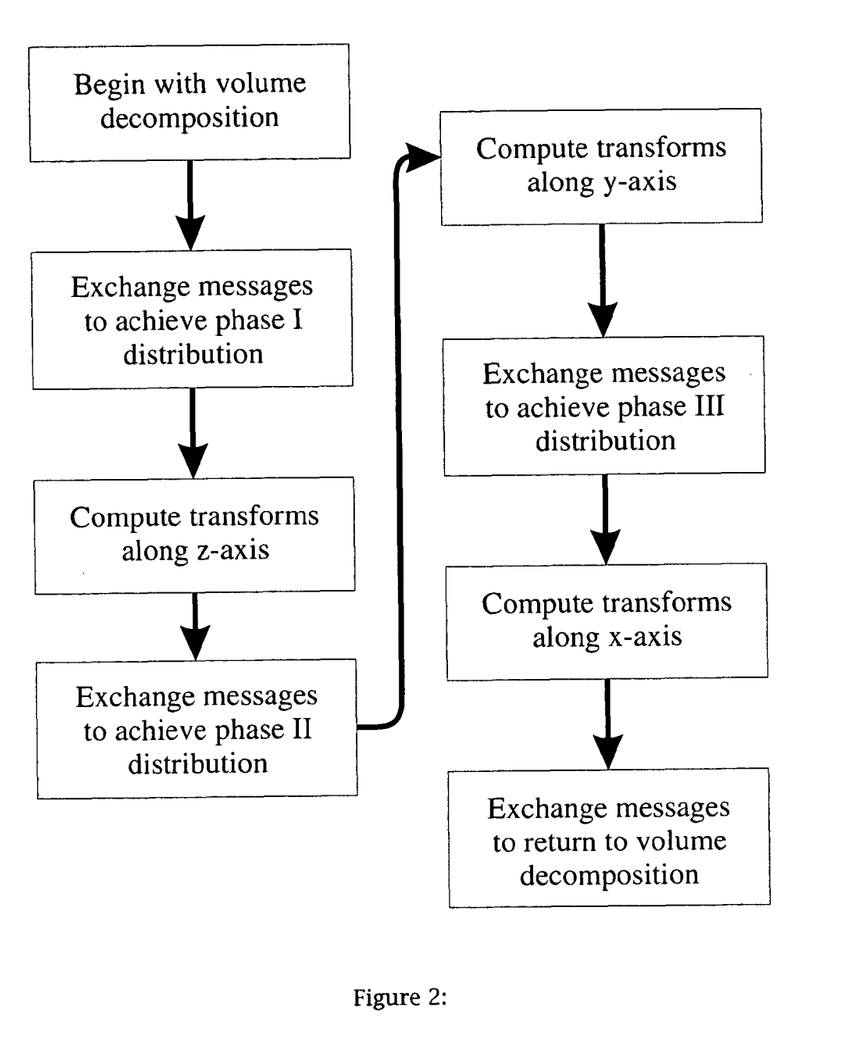
FIG. 2 is a flowchart showing the control flow of the process of one embodiment of the present invention.

FIG. 2 is a flowchart showing the control flow of the process of one embodiment of the present invention. The flowchart of FIG. 2 outlines the steps followed in performing a distributed three-dimensional FFT using the method of the present invention. In the first step, it assumed that the data to be transformed (the $N_x*N_y xN_z$ FFT mesh points) are distributed in a natural "volume decomposition" over the ($P_x*P_y xP_z$ physical or virtual) three-dimensional processor mesh so that every processor node has a subset ( ) of FFT mesh points representing a sub-volume. An example of such a mapping is defined by the following expression for the processor node coordinates in terms of the FFT node coordinates:

$$(p_x, p_y, p_z) = (\lfloor x/n_x \rfloor, \lfloor y/n_y \rfloor, \lfloor z/n_z \rfloor)$$

where $n_i = N_i/P_i$

In the second step, messages are exchanged along one axis (the example given here has messages sent along the z-axis) to achieve the Phase I distribution of mesh points over processor nodes which allows the independent computation of the one-dimensional FFTs along the z-axis:

$$p_x^{dest} = \left\lfloor \frac{x}{n_x} \right\rfloor$$

$$p_y^{dest} = \left\lfloor \frac{y}{n_y} \right\rfloor$$

$$p_z^{dest} = \left\lfloor \frac{(\delta_y + n_y \delta_x) p_z}{n_x n_y} \right\rfloor$$

In the third step, the one-dimensional transforms along the z-axis are computer (no inter-node communication is required during this step). In the fourth step, messages are exchanged between nodes in the same plane of processors (the y-z plane for the example target distribution given here):

$$p_x^{dest} = \left\lfloor \frac{x}{n_x} \right\rfloor$$

$$p_y^{dest} = \left\lfloor \frac{\delta_x + n_x(k_z - n_z \lfloor k_z/n_z \rfloor) P_y}{n_x n_z} \right\rfloor$$

$$= \left\lfloor \frac{(\delta_x + n_x \delta k_z) P_y}{n_x n_z} \right\rfloor$$

$$p_z^{dest} = \left\lfloor \frac{-k_z}{n_z} \right\rfloor$$

In the fifth step, the one-dimensional transforms along the y-axis are computed (no inter-node communication is required during this step). In the sixth step, messages are exchanged between nodes in the same place of processors (the x-y plane for the example target distribution given here):

$$p_x^{dest} = \left\lfloor \frac{x}{n_x} \right\rfloor$$

$$p_y^{dest} = \left\lfloor \frac{\delta_x + n_x(k_z - n_z \lfloor k_z/n_z \rfloor) P_y}{n_x n_z} \right\rfloor$$

$$= \left\lfloor \frac{(\delta_x + n_x \delta k_z) P_y}{n_x n_z} \right\rfloor$$

-continued $$p_z^{dest} = \left\lfloor \frac{k_z}{n_z} \right\rfloor$$

In the seventh step, the one-dimensional transforms along the x-axis are computed (no inter-node communication is required during this step). In the eighth and final step for a standalone three-dimensional FFT, messages are exchanged along the x-axis to return to a volume decomposition, except now the mesh volume being distributed over processor nodes is in reciprocal space (k-space) so that mapping of FFT mesh to processor node mesh is given by:

$$(p_x, p_y, p_z) = (\lfloor k_x/n_x \rfloor, \lfloor k_y/n_y \rfloor, \lfloor k_z/n_z \rfloor)$$

One should note that the correct result for the three-dimensional FFT can be obtained using any order for the successive one-dimensional transforms. Although the order z-y-x was used here, any permutation of x, y, and z is permissible and it is straightforward to write down the distributions corresponding to the phases required for these alternative permutations. Also, the inverse three-dimensional FFT can be computed using the same set of distributions for each phase, but applying the inverse one-dimensional transform at the appropriate points instead of the forward transform.

The present invention describes an implementation of a distributed three-dimensional FFT that allows scalability beyond that obtainable with previous approaches, such as typical "slab" decomposition approaches. This implementation starts with a volumetric decomposition of the data across the 3-dimensional processor mesh. To evaluate sin N*N*N FFT, the "row-column" method is used to decompose the problem into successive evaluations of $N^2$ one-dimensional FFTs along each axis. Without parallelizing the evaluation of the individual 1-D FFTs, the concurrency inherent in the computational phase for this method allows scaling to $N^2$ nodes. The proposed implementation uses the high performance torus interconnect, an efficient distribution scheme across processors, and strided accesses through local memory to carry out the distributed transposes efficiently. The proposed implementation works efficiently on other high performance network topologies.

Consider the d-dimensional array Ox of dimensions No *Ni xfy$^x$ . . . *Nd–i where x=(xq, X], x2, . . . , Xd–i), Xj G Zm–The Fourier transform=$\hat{}_x[a]$ consisting of a d-dimensional array of No N] N2 . . . Nd.] numbers where k=(ko, kj, k,2, . . . kd–i), $k_t$ C Zm is defined by:

$$\hat{a}_k = \frac{1}{\sqrt{n}} \sum_{x_0=0}^{N_0-1} \sum_{x_1=0}^{N_1-1} \cdots \sum_{x_{d-1}=0}^{N_{d-1}} a_x \prod_{l=0}^{d-1} \exp(2\pi i x_l k_l / N_l) \quad (1)$$

$$= \frac{1}{\sqrt{N_0}} \sum_{x_0=0}^{N_0-1} \exp(2\pi i x_0 k_0 / N_0)$$

$$\frac{1}{\sqrt{N_1}} \sum_{x_1=0}^{N_1-1} \exp(2\pi i x_1 k_1 / N_1) \ldots$$

$$\frac{1}{\sqrt{N_{d-1}}} \sum_{x_{d-1}=0}^{N_{d-1}-1} \exp(2\pi i x_{d-1} k_{d-1} / N_{d-1}) a_x$$

$$= \mathcal{F}_{x_0}^1 \cdot \mathcal{F}_{x_1}^1 \cdot \ldots \cdot \mathcal{F}_{x_{d-1}}^1 [a]$$

For the target scientific application, system sizes are such that mesh dimensions of $64^3$ or $128^3$ are most common. For small node count systems, a "slab" decomposition of the FFT onto an array of processors is most efficient. However, this would only allow mapping of the FFT onto partitions with at most 64 or 128 nodes. In principle, there is plenty of work to distribute over a much larger number of nodes since there are $3*N^2$ ID FFTs to be computed overall.

Assuming that the individual ID FFTs are not to be parallelized, each stage in the 3D FFT requires $N^2$ ID FFT computations.

Figure 3:
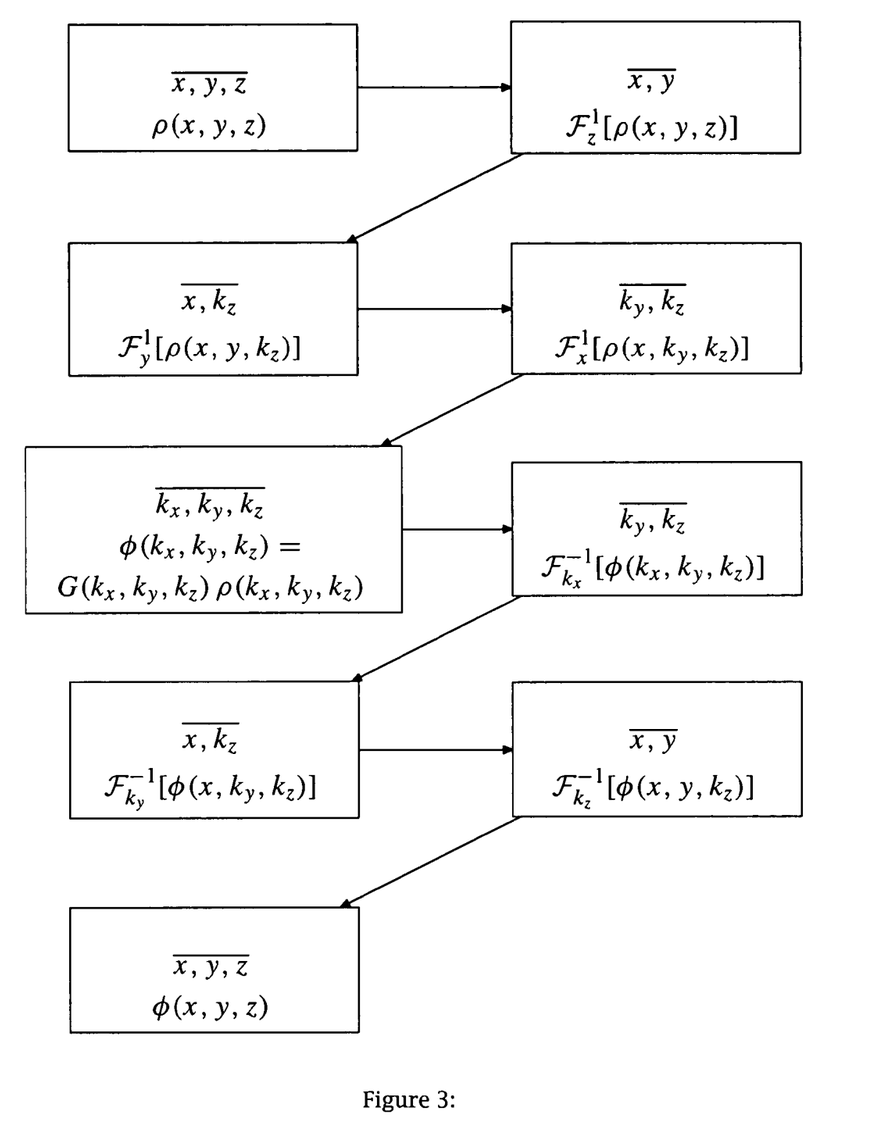
FIG. 3 is a diagram showing dataflow and candidate partitioning keys for the computations of a convolution of one embodiment of the present invention.

FIG. 3 is a diagram showing dataflow and candidate partitioning keys for the computations of a convolution of one embodiment of the present invention. A convolution can be carried out quickly by the use of transform methods of the present invention. In the case illustrated here, first a forward three-dimensional FFT is performed, then the transformed charge distribution is multiplied by the kernel function and then an inverse three-dimensional FFT is performed. When doing a convolution it is possible to eliminate a communication step on either side of the kernel evaluation because returning to a "neat" volume decomposition on the processor nodes is not necessary to the kernel evaluation/multiplication step.

The variables used as input to a "hashing" function that maps mesh points onto processor nodes are shown with a line above them. The distributions described here represent one possible set of such hashing functions.

For a machine with three dimensional torus/mesh interconnect, it is natural to use a volume decomposition to map the 3D mesh domain onto the machine. Assuming that the domain mesh dimensions are No$^x$N/xN2 and that the machine partition size is P=Po$^x$Pi$^x$P2 then each node will have responsibility for (N(/Pq)$^x$(Ni/Pj)$^x$(N2/P2) mesh points as shown in FIG. 1.

Figure 1:
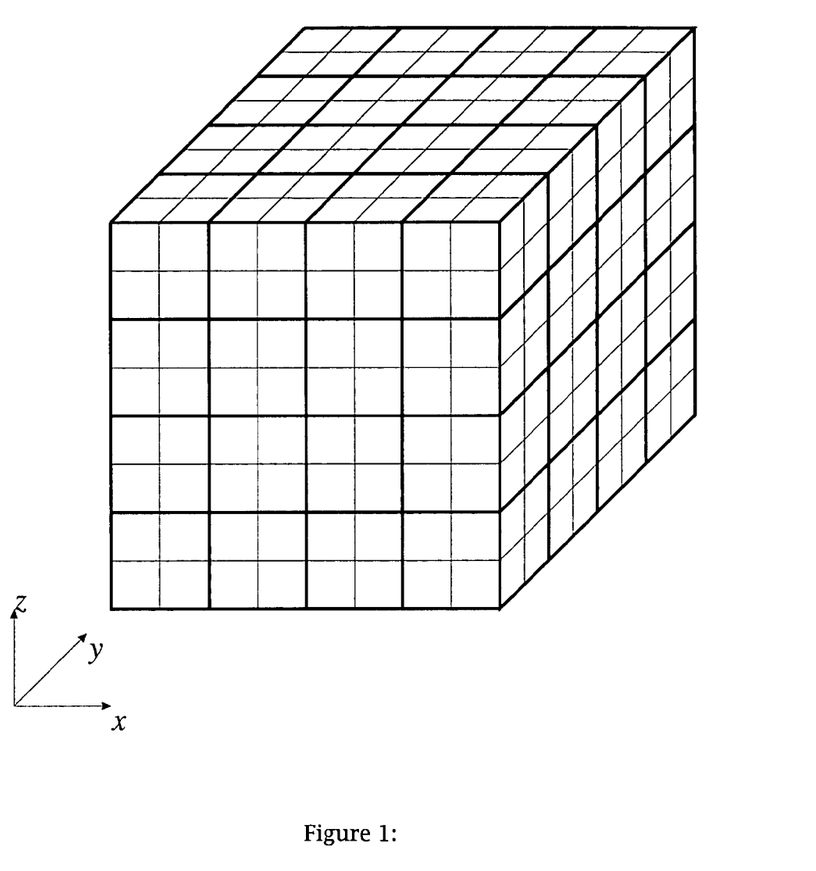
FIG. 1 is an illustration showing a mapping between an FFT mesh and a processor mesh in one embodiment of the present invention.

FIG. 1 is an illustration showing a mapping between an FFT mesh and a processor mesh in one embodiment of the present invention. The FFT mesh is mapped onto the processor mesh in volume decomposition. In this figure, the FFT mesh is 8×8×8 while the processor mesh is 4×4. In this case, each node in the processor mesh has 8 FFT mesh points, representing one 64th of the total volume of the system. The thin lines indicate the "boundaries" between FFT mesh points while the heavier lines indicate the "boundaries" between processors (nodes).

During each phase of the 3D FFT outlined in FIG. 2, communication occurs along rows of nodes or within a plane of nodes. The process during the first phase, is defined as:

Each node in the row sends P,–1 messages to the other nodes in the row. Each message contains $(N_x/P_x) \times (N/P_y) \times (N_z/P_z) \times (1/P,) \times$ sizeof(complex) bytes.

Each node carries out (Nj/Pj)$^x$(Ni/Pk)$^x$(1/Pi) one-dimensional FFTs on local data.

Each node in the row sends Pi–\ messages to the other nodes in the row. Each message contains $(N_x/P_x) \times (N/P_y) \times (N_z/P_z) \times (1/P,) \times$ sizeof(complex) bytes.

For example, a 512 node partition (8×8×8) working on a 128×128×128 mesh implies a total data volume leaving or entering each node of:

2×8×7×i28/8×128/8×128/8×1/8×sizeof(double)

For the case where $\hat{}$ is real, the transformed data have additional symmetries that can be used to save computations and/or space. For convenience, we will write:

$$\hat{a}(k_0, k_1, \ldots, k_l, x_{l+1}, x_{l+2}, \ldots, x_{d-1}) = \hat{a}(\hat{k}, \hat{x}) =$$

$$= \mathcal{F}_{x_0}^1 \circ \mathcal{F}_{x_1}^1 \cdot \ldots \cdot \mathcal{F}_{x_l}^1 [a]$$

If $a_x \in R$ then $a\pounds = a_x$ which implies that:

$$\hat{a}(\hat{k},\hat{x})^* = \hat{a}(-\hat{k},\hat{x})$$

The sequence of distribution and operations for the forward part of a 3D-FFT intended for use in convolution looks like this:

$$(x,y,z) \xrightarrow{FFT(z)} (x,y) \xrightarrow{FFT(y)} (x,k_z) \xrightarrow{FFT(x)} (k_y,k_z) \quad (2)$$

At the beginning of the first phase, the mesh points are distributed in a volume decomposition on the processor mesh so that $N_x \times N_y \times N_z$ mesh points are distributed over $P_x \times Py \times P_z$ processors. Each processor will contain $\{N_x/P_x) \times (Ny/P_y)^x (N_z P_z) = n_x \times n_y \times n_z$ mesh points, where $n_i = N_i/P_i$. For convenience, we will define the relative coordinate of a mesh point within a processor as:

$$\delta x \equiv x - \lfloor x/n_x \rfloor n_x \quad (3)$$

$$\delta y \equiv y - \lfloor y/n_y \rfloor n_y \quad (4)$$

$$\delta z \equiv z - \lfloor z/n_z \rfloor n_z \quad (5)$$

and the processor coordinate $(p_x, p_y, p_z)$ for mesh coordinate $(x, y, z)$ is:

$$(p_x, p_y, p_z) = (\lfloor x/n_x \rfloor, \lfloor y/n_y \rfloor, \lfloor z/n_z \rfloor) \quad (6)$$

where the floor function $\lfloor x \rfloor$ is the greatest integer less than or equal to x, $x \in Z_{Nx}$, $y \in Z_{Ny}$, and $z \in Z_{Nz}$.

During the first phase, all of the meshpoints corresponding to a particular pair of x and y coordinates must be mapped to the same processor so that the one-dimensional FFT can be performed along the z-coordinate. One mapping of (x, y) to the processor requires only communications along the z-direction so that $$p_x^{dest} = \left\lfloor \frac{x}{n_x} \right\rfloor$$

$$p_y^{dest} = \left\lfloor \frac{y}{n_y J} \right\rfloor$$

$$p_z^{dest} = \lfloor -(\delta y + n_y \delta x) P in_x n_y \rfloor$$

This mapping attempts to keep ranges of y values together because the next phase involves one-dimensional FFTs along the y-coordinate. We would also like to be able to calculate what range of $\delta x$ and $\delta y$ is sent to a particular node $p_z$. Let us define the offset $$\Delta_{yx} \equiv \delta y + n_y \delta x \quad (10)$$

so that $$\delta_x = \left\lfloor \frac{\Delta_{yx}}{n_y} \right\rfloor \quad (11)$$

$$\delta_y = \Delta_{yx} \bmod n_y \quad (12)$$

and $$p_z^{dest} = \left\lfloor \frac{\Delta_{yx} P_z}{n_x n_y} \right\rfloor.$$

Given this expression for $p_z^{des1}$, we can say that $$p_z^{dest} \le \frac{\Delta_{yx} P_z}{n_x n_y}$$

and $$p_z^{dest} + 1 > \frac{\Delta_{yx} P_z}{n_x n_y}$$

implying that $$\frac{n_x n_y p_z^{dest}}{P_z} \le \Delta_{yx} < \frac{n_x n_y (p_z^{dest}+1)}{P_z} \quad (13)$$

One can write the expression for the range of $\Delta_{yx}$ in the following form:

$$\Delta_{yx} \in \left[ \frac{n_x n_y p_z^{dest}}{P_z}, \frac{n_x n_y (p_z^{dest}+1)}{P_z} \right) \quad (14)$$

The actual x and y offsets can be calculated from $\Delta_{yx}$ using the expressions:

$$\delta_x = \left\lfloor \frac{\Delta_{yx}}{n_y} \right\rfloor \quad (15)$$

$$\delta_y = \Delta_{yx} \bmod n_y \quad (16)$$

At the beginning of this phase, the values corresponding to the full range of z values have been transformed into values corresponding to a range of $k_z$ values. If we were trying to be "neat," we might want to transform the distribution of mesh points so that the data defined over the mesh $(x, y, k_z)$ were distributed in a volume decomposition over the processor mesh so that:

$$(p_x, p_y, p_z) = (\lfloor x/P_x \rfloor, \lfloor y/P_y \rfloor, \lfloor k_z/P_z \rfloor).$$

However, we need to then map all mesh points with same x and $k_z$ values to the same node so that the one-dimensional FFTs along the y-coordinate can be performed. An example of a mapping appropriate for this end that involves communication along the y and $$p_x^{dest} = \left\lfloor \frac{x}{n_x} \right\rfloor \quad (17)$$

$$p_y^{dest} = \left\lfloor \frac{\delta_x + n_x(k_z - n_z \lfloor k_z/n_z \rfloor) P_y}{n_x n_z} \right\rfloor \quad (18)$$

$$= \left\lfloor \frac{(\delta_x + n_x \delta k_z) P_y}{n_x n_z} \right\rfloor$$

$$p_z^{dest} = \left\lfloor \frac{k_z}{n_z} \right\rfloor \quad (19)$$

where $\delta k_z \equiv k_z - n_z \lfloor k_z/n_z \rfloor$.

This mapping attempts to keep ranges of x values together because the next and final phase involves one-dimensional FFTs along the x-coordinate.

We can define $\Delta_{xkz} \equiv \delta x + n_x \delta k_z$ and write down an expression for the range of $\Delta_{xkz}$ analogous to Equation 14:

$$\Delta_{xk_z} \in \left[ \left\lfloor \frac{n_x n_z p_y^{dest}}{P_y} \right\rfloor, \left\lfloor \frac{n_x n_z p_y^{dest}}{P_y} + \frac{n_x n_z}{P_y} \right\rfloor \right)$$

At the beginning of this phase our mesh points are distributed over (x, $k_y$, $k_z$) and the mapping to the processors has all mesh points corresponding to particular values of x and $k_z$ mapped to the same processor. By analogy with the expressions for Phase II and in order to keep ranges of $k_y$ values together because of the order of transforms required for the inverse 3D-FFT to follow, we write an expression for a possible mapping to processors:

$$p_x^{dest} = \left\lfloor \frac{(\delta k_y + n_y \delta k_z) P_x}{n_y n_z} \right\rfloor$$

$$p_y^{dest} = \left\lfloor \frac{k_y}{n_y} \right\rfloor$$

$$p_z^{dest} = \left\lfloor \frac{k_z}{n_z} \right\rfloor$$

where $\delta k_y \equiv k_y - n_y \lfloor k_y/n_y \rfloor$.

Figure 4:
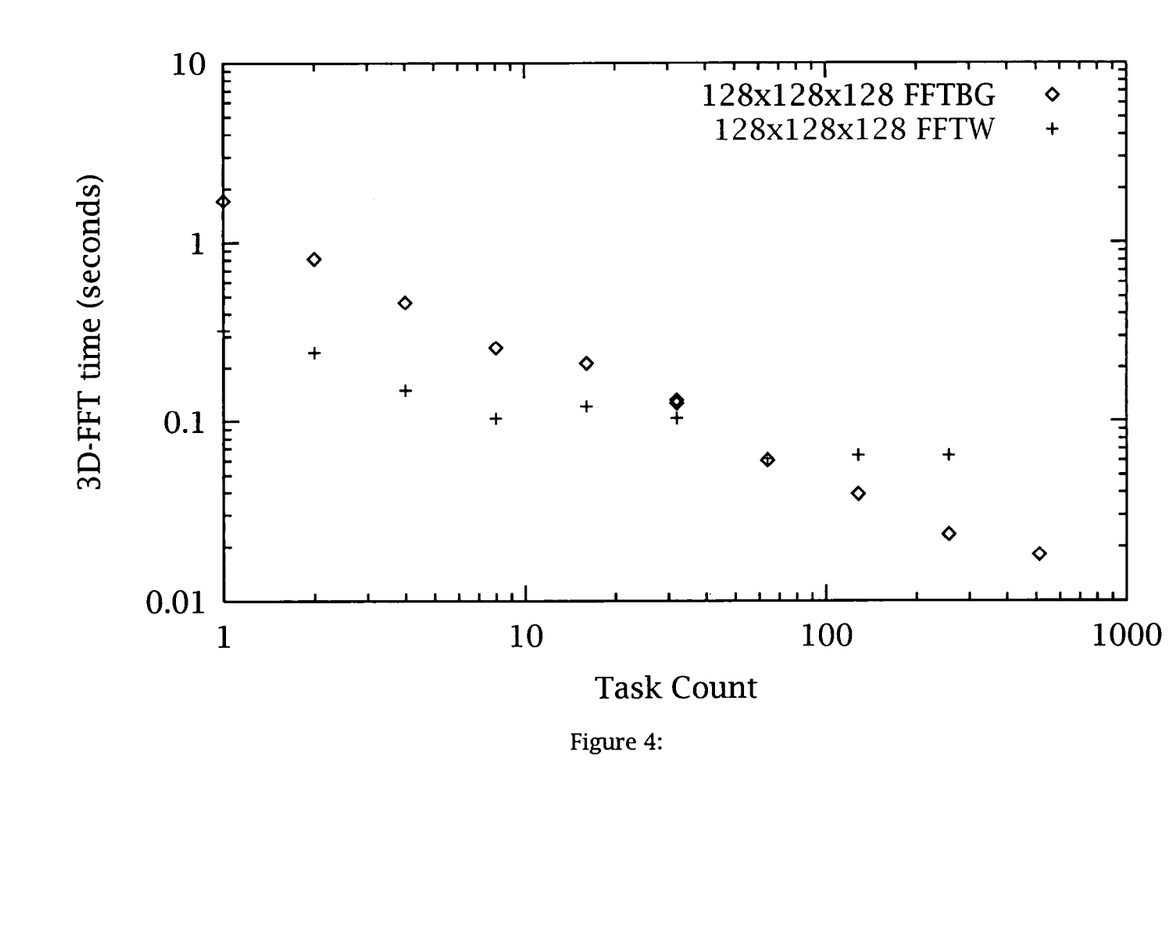
FIG. 4 is a graph showing a comparison between approaches to the computation of the present invention on a distributed memory network.

One implementation of the present invention used a 512 node system as a test platform. The results of this implementation and a comparison with a previous approach are shown in FIG. 4. FIG. 4 is a graph showing a comparison between approaches to the computation of the present invention on a distributed memory network. This implementation uses a non-mesh/torus interconnect topology. The execution times for a 128×128×128 FFT are plotted as a function of node/task count (the results from an early implementation of the method disclosed here are shown as diamonds while the results from the FFTW library routine are shown as crosses). Note that while FFTW's "slab" decomposition flattens out at high node counts, the volumetric FFT continues to increase in speed through 512 nodes.

Figure 5:
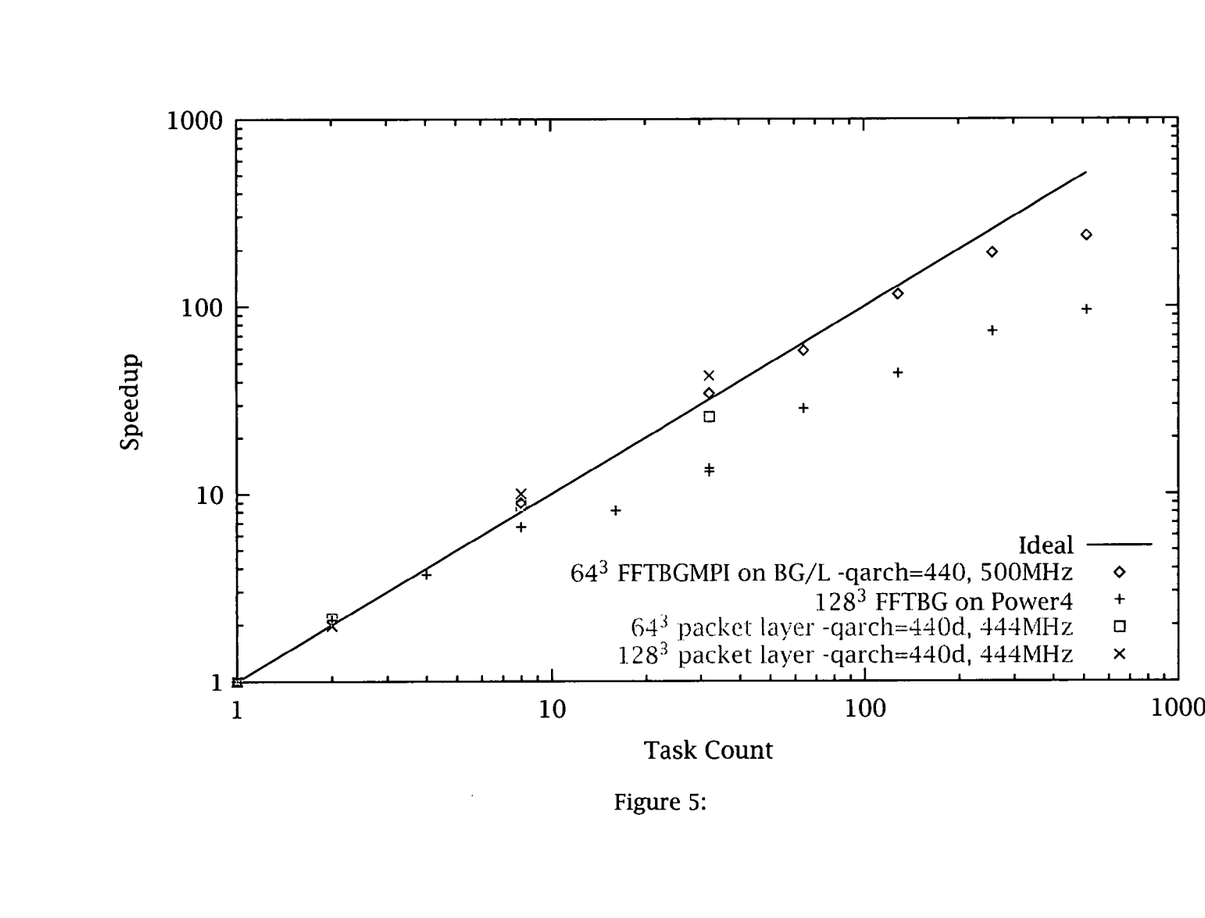
FIG. 5 is a graph showing a comparison between hardware used for the computation of the present invention.

FIG. 5 is a graph showing a comparison between hardware used for the computation of the present invention. Measured speedups on differing types of hardware are shown in FIG. 5. The speedup is computed as the ratio of the execution time using a single node to execution time using p nodes/tasks. Ideal behavior would be linear speedup.

Figure 6:
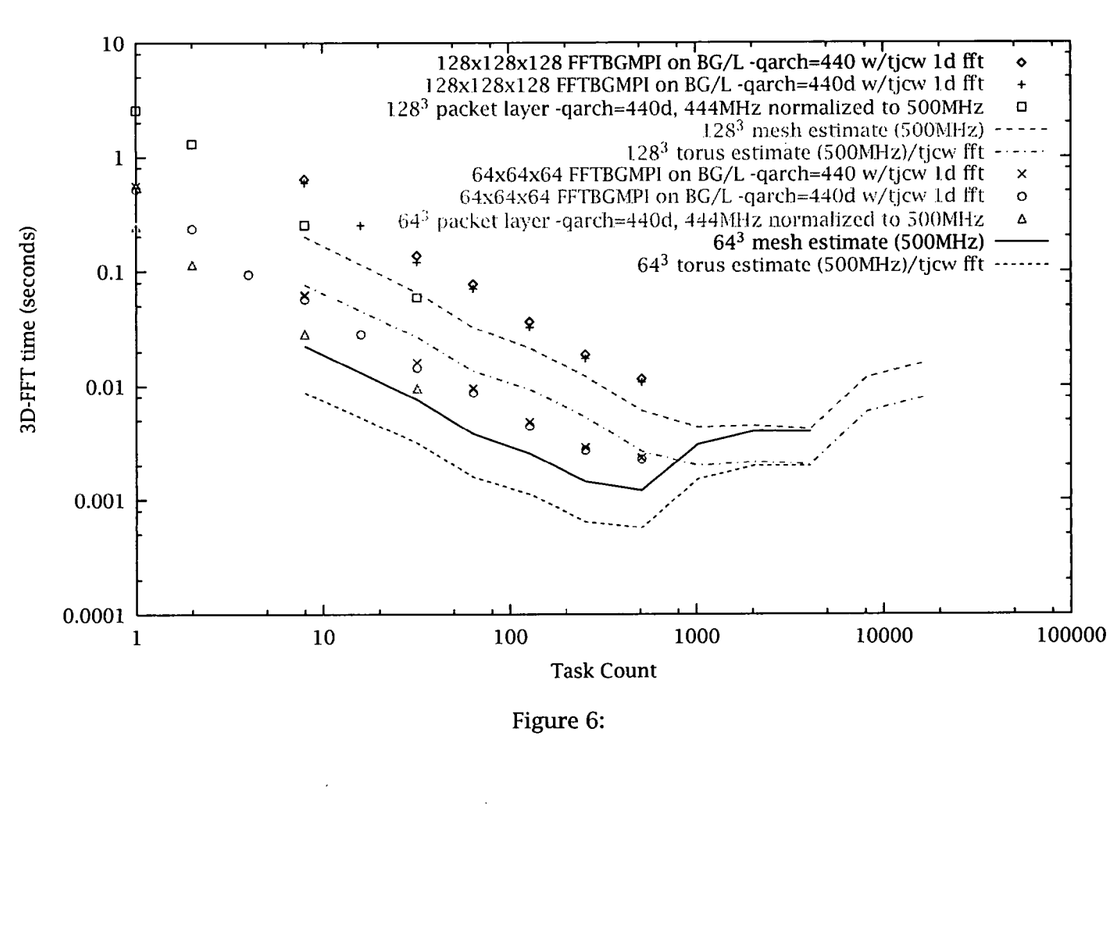
FIG. 6 is another graph showing a comparison between hardware used for the computation of the present invention.

FIG. 6 is another graph showing a comparison between hardware used for the computation of the present invention. FIG. 6 shows the performance achieved thus far using a variety of one-dimensional FFT building blocks. Measured execution times on differing types of hardware are shown in FIG. 6. Estimates of the limits to performance for this method using hardware design parameters are shown as well.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following: a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 8:
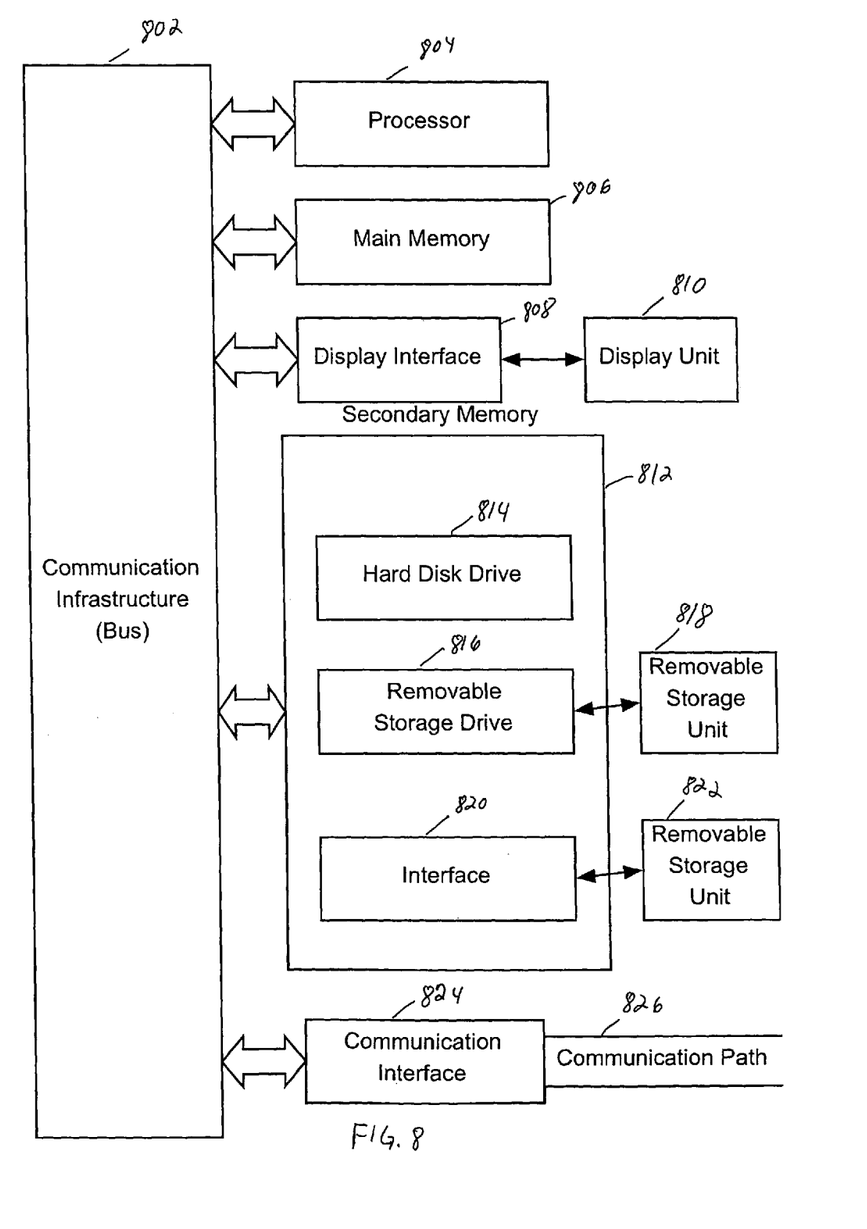
FIG. 8 is a high level block diagram showing an information processing system useful for implementing one embodiment of the present invention.

FIG. 8 is a high level block diagram showing an information processing system useful for implementing one embodiment of the present invention. The computer system includes one or more processors, such as processor 804. The processor 804 is connected to a communication infrastructure 802 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 808 that forwards graphics, text, and other data from the communication infrastructure 802 (or from a frame buffer not shown) for display on the display unit 810. The computer system also includes a main memory 806, preferably random access memory (RAM), and may also include a secondary memory 812. The secondary memory 812 may include, for example, a hard disk drive 814 and/or a removable storage drive 816, representing a floppy disk drive, a magnetic tape drive, an optical disk drive, etc. The removable storage drive 816 reads from and/or writes to a removable storage unit 818 in a manner well known to those having ordinary skill in the art. Removable storage unit 818, represents a floppy disk, a compact disc, magnetic tape, optical disk, etc. which is read by and written to by removable storage drive 816. As will be appreciated, the removable storage unit 818 includes a computer readable medium having stored therein computer software and/or data.

In alternative embodiments, the secondary memory 812 may include other similar means for allowing computer programs or other instructions to be loaded into the computer system.

Such means may include, for example, a removable storage unit 822 and an interface 820. Examples of such may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to the computer system.

The computer system may also include a communications interface 824. Communications interface 824 allows software and data to be transferred between the computer system and external devices. Examples of communications interface 824 may include a modem, a network interface (such as an Ethernet card), a communications port, a PCMCIA slot and card, etc. Software and data transferred via communications interface 824 are in the form of signals which may be, for example, electronic, electromagnetic, optical, or other signals capable of being received by communications interface 824. These signals are provided to communications interface 824 via a communications path (i.e., channel) 826. This channel 826 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 806 and secondary memory 812, removable storage drive 816, a hard disk installed in hard disk drive 814, and signals. These computer program products are means for providing software to the computer system. The computer readable medium allows the computer system to read data, instructions, messages or message packets, and other computer readable information from the computer readable medium. The computer readable medium, for example, may include nonvolatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 806 and/or secondary memory 812. Computer programs may also be received via communications interface 824. Such computer programs, when executed, enable the computer system to perform the features of the present invention as discussed herein. In particular, the computer programs, when executed, enable the processor 804 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

The invention claimed is:

1. A non-transitory computer readable storage medium comprising computer readable program instructions for:
storing a three-dimensional N×N×N matrix in a distributed memory network comprising a plurality of nodes, where there exists a mapping of the nodes onto the three-dimensional array of dimension Px×Py×Pz such that every node can be assigned a coordinate (px, py, pz);
using a control node for distributing work associated with a calculation of a transform
of the three-dimensional matrix among $N^2$ of the plurality of nodes;
wherein distributing the work comprises:
allocating to each node points in the matrix corresponding to a specific set of x, y values, wherein a point (x, y, z) in the matrix is assigned to the node coordinates (px, py, pz) according to the mapping selected from:
the mapping where px=floor(x/nx), py=floor(y/ny), pz=floor((dy+ny dx)Pz/(nx ny));
and the mapping where px and py are the same, but pz=floor((dx+nx dy)Pz/(nx ny));
where nx is defined as Nx/Px, dx is defined as x-floor(x/nx) nx and similarly for ny, dy and nz, dz and floor(x) is defined as the greatest integer less than or equal to x; and
receiving results of the calculation of the transform of the matrix by the nodes.

2. The computer readable storage medium of claim 1 wherein the program instructions further use the control node for distributing the work by performing a notational exchange of y and z.

3. The computer readable storage medium of claim 1 wherein the program instructions further use the control node for distributing the work by performing a notational exchange of x and z.

4. The computer readable storage medium of claim 1 wherein the program instructions further use the control node for distributing the work associated with a calculation of a fast Fourier transform of the matrix among $N^2$ of the plurality of the nodes.

5. The computer readable storage medium of claim 4, wherein the control node further allocates to each node points in the matrix corresponding to a specific set of x, z values.

6. The computer readable storage medium of claim 4, wherein the control node allocates to each node points in the matrix corresponding to a specific set of y, z values.

7. The computer readable storage medium of claim 4, wherein the receiver further receives results of the calculation of the fast Fourier transform of the matrix by the nodes.

8. A non-transitory computer readable storage medium comprising computer readable program instructions for:
storing a three-dimensional N×N×N matrix in a distributed memory network comprising a plurality of nodes, where there exists a mapping of the plurality of nodes onto a three-dimensional array of dimension Px×Py×Pz such that every node can be assigned a coordinate (px, py, pz);
using a control node for:
distributing work associated with a calculation of a transform of the three-dimensional matrix among $N^2$ of the plurality of nodes;
wherein distributing the work comprises:
allocating to each node points in the three-dimensional matrix corresponding to a specific set of x, z values where a point (x, y, z) in the matrix is assigned to node coordinates (px, py, pz) according to the mapping where px and py are the same, and pz=floor((dx+nx dy)Pz/(nx ny)), wherein nx is defined as Nx/Px, dx is defined as x-floor(x/nx) nx and similarly for ny, dy and nz, dz and floor(x) is defined as a greatest integer less than or equal to x; and
receiving results of the calculation of the transform of the matrix by the nodes.

9. The computer readable storage medium of claim 8 wherein the control node performs the allocating by performing a notational exchange of y and z.

10. The computer readable storage medium of claim 8 wherein the control node performs the allocating by performing a notational exchange of x and z.

11. The computer readable storage medium of claim 8 wherein the control node performs the distributing by using a fast Fourier transform of the three-dimensional matrix.

12. The computer readable storage medium of claim 11 wherein the control node performs the distributing by allocating to each node points in the three-dimensional matrix corresponding to a specific set of x, z values.

13. The computer readable storage medium of claim 11 wherein the control node performs the distributing by allocating to each node points in the three-dimensional matrix corresponding to a specific set of y, z values.

14. The computer readable storage medium of claim 11 wherein the receiver receives results of the calculation of the fast Fourier transform of the matrix by the nodes.

15. A non-transitory computer readable storage medium comprising computer readable program instructions for:
    storing a three-dimensional N×N×N matrix in a distributed memory network comprising a plurality of nodes, where there exists a mapping of the plurality of nodes onto a three-dimensional array of dimension Px×Py×Pz such that every node can be assigned a coordinate (px, py, pz);
    using a control node for:
    distributing work associated with a calculation of a transform of the three-dimensional matrix among $N^2$ of the plurality of nodes;
    wherein distributing the work comprises:
    allocating to each node points in the three-dimensional matrix corresponding to a specific set of x, z values where a point (x, y, z) in the matrix is assigned to node coordinates (px, py, pz) according to the mapping where px=floor(x/nx), py=floor(y/ny), pz=floor((dy+ny dx)Pz/(nx ny)), wherein nx is defined as Nx/Px, dx is defined as x-floor(x/nx) nx and similarly for ny, dy and nz, dz, and floor(x) is defined as a greatest integer less than or equal to x; and
    receiving results of the calculation of the transform of the matrix by the nodes.

16. The computer readable storage medium of claim 15 wherein the control node performs the allocating by performing a notational exchange of y and z.

17. The computer readable storage medium of claim 15 wherein the control node performs the allocating by performing a notational exchange of x and z.

18. The computer readable storage medium of claim 15 wherein the control node is further configured for distributing the work associated with a calculation of a fast Fourier transform of the matrix among $N^2$ of the plurality of the nodes.

19. The computer readable storage medium of claim 18 wherein the control node performs the distributing by allocating to each node points in the three-dimensional matrix corresponding to a specific set of y, z values.

20. The computer readable storage medium of claim 18 wherein the receiver receives results of the calculation of the fast Fourier transform of the matrix by the nodes.

* * * * *